United States Patent
Han et al.

(10) Patent No.: US 10,224,841 B2
(45) Date of Patent: Mar. 5, 2019

(54) MOTOR CONTROL SYSTEM AND METHOD FOR COMPENSATING DISTURBANCE

(71) Applicants: Hyundai Motor Company, Seoul (KR); Korea Advanced Institute of Science and Technology, Daejeon (KR)

(72) Inventors: Min Woo Han, Seoul (KR); Woo Je Sung, Gyeonggi-do (KR); Jong Ho Lee, Incheon (KR); Kyung Soo Kim, Daejeon (KR); Yong Hun Kim, Daejeon (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 183 days.

(21) Appl. No.: 15/283,076

(22) Filed: Sep. 30, 2016

(65) Prior Publication Data

US 2017/0110992 A1 Apr. 20, 2017

(30) Foreign Application Priority Data

Oct. 14, 2015 (KR) .................. 10-2015-0143399

(51) Int. Cl.
*H02P 6/08* (2016.01)
*H02P 21/00* (2016.01)
*H02P 21/13* (2006.01)

(52) U.S. Cl.
CPC ............ *H02P 6/08* (2013.01); *H02P 21/0003* (2013.01); *H02P 21/13* (2013.01)

(58) Field of Classification Search
CPC .... Y02T 10/643; B60L 15/20; B60L 2210/20; H02K 19/34; H02K 3/28
See application file for complete search history.

(56) References Cited

U.S. PATENT DOCUMENTS

| | | | | |
|---|---|---|---|---|
| 5,923,728 A | * | 7/1999 | Ikkai | ................... B60L 11/1803 318/400.28 |
| 2016/0218652 A1 | * | 7/2016 | Yamaguchi | ............ G05B 13/02 |

FOREIGN PATENT DOCUMENTS

| JP | H11-31014 A | 2/1999 |
|---|---|---|
| JP | 2007-112366 A | 5/2007 |

(Continued)

OTHER PUBLICATIONS

Lee, Youn-kyu et al. "Robust Control of Magnet Synchronous Motor Using Disturbance Observer and Sliding Mode Controller." Journal of the Korea Institute of Information and communication Engineering, vol. 19, No. 7, pp. 1660-1670, 2015.

*Primary Examiner* — Shawki S Ismail
*Assistant Examiner* — Zoheb Imtiaz
(74) *Attorney, Agent, or Firm* — Mintz Levin Cohn Ferris Glovsky and Popeo, P.C.; Peter F. Corless

(57) ABSTRACT

A motor control system is provided for compensating disturbance. The system includes a controller that supplies an input voltage to a motor based on the difference between a current command value to a motor and an actual current of the motor. A motor modeling part outputs a motor output current based on an input voltage from the controller and a disturbance observation part is formed as a reverse model of the motor modeling part to remove current noise using a current differentiation filtering method. Additionally, a disturbance compensation amount determination part determines a disturbance compensation amount based on the disturbance estimated by the disturbance observation part.

8 Claims, 3 Drawing Sheets

(56) References Cited

FOREIGN PATENT DOCUMENTS

| | | |
|---|---|---|
| JP | 2008-030560 A | 2/2008 |
| JP | 2013-078200 A | 4/2013 |
| JP | 5870591 B2 | 3/2016 |
| KR | 10-0618885 B1 | 9/2006 |
| KR | 2011-0036979 A | 4/2011 |
| KR | 10-1393765 B1 | 5/2014 |

\* cited by examiner

MOTOR CONTROL SYSTEM AND METHOD FOR COMPENSATING DISTURBANCE

CROSS-REFERENCE TO RELATED APPLICATION

This application claims under 35 U.S.C. § 119(a) the benefit of priority to Korean Patent Application No. 10-2015-0143399 filed on Oct. 14, 2015, the entire contents of which are incorporated herein by reference.

BACKGROUND (a) Technical Field

The present disclosure relates to a motor control system and method for compensating disturbance, and more particularly, to a motor control system and method for compensating disturbance to reduce noise while providing an operation stability of a permanent magnet type synchronous motor.

(b) Background Art

The permanent magnet type synchronous motor in general may be controlled for three purposes, namely, a torque control using a current control, a speed control, and a position control. The torque control is a control procedure based on the speed control and the position control and in general is referred to as a current control since the current is in direct proportion to torque. The torque control, namely, a current control, is executed with a proportional-integral (PI) controller and a linear feedback control, but it is disadvantageous that control stability may be degraded due to disturbance such as a back-emf, etc. Any change in a magnetic flux induced by a stator when a permanent magnet rotates may interact with the current of a stator, thereby generating nonlinearity due to the back-emf. The nonlinearity may change a motor model or may be interpreted as disturbance.

The nonlinearity due to the disturbance such as the back-emf may be estimated using a parameter value of a motor circuit, the current, and a motor speed measurement, but a new design for a controller is still required for compensating disturbance. To compensate any effects of the back-emf, a feed-forward and a feedback control method are mainly being used in the conventional technology, but such a method is sensitive to any unexpected change in parameters, and requires accurate measurement of a motor speed.

The above information disclosed in this section is merely for enhancement of understanding of the background of the invention and therefore it may contain information that does not form the prior art that is already known in this country to a person of ordinary skill in the art.

SUMMARY

The present invention provides a motor control system for compensating disturbance wherein a current noise may be removed through differentiation using a cut off frequency at a disturbance observation part made in the form of a reverse model with respect to a motor model, and any disturbance may be compensated using a gain used to determine a disturbance compensation amount, thereby enhancing operation stability and responsibility for the control of the permanent magnet type synchronous motor.

Accordingly, in one aspect, the present invention provides a motor control system for compensating disturbance which may include a controller configured to supply an input voltage to a motor based on the difference between a current command value to a motor and an actual output current of the motor; a motor model part configured to output a motor output current based on an input voltage from the controller; a disturbance observation part configured in the form of a reverse model of the motor model part to remove current noise using a current differentiation filtering method; and a disturbance compensation amount determination part configured to determine a disturbance compensation amount based on the disturbance estimated by the disturbance observation part.

The motor model part may be modeled into $$\begin{bmatrix} I_q(s) \\ I_d(s) \end{bmatrix} = W \begin{bmatrix} 1/(L_q s + R_s) & 0 \\ 0 & 1/(L_d s + R_s) \end{bmatrix} \begin{bmatrix} V_{qs}(s) \\ V_{ds}(s) \end{bmatrix}$$

which is a primary voltage equation type.

The disturbance observation part may be formed by reversely modeling the motor model part into $$\begin{bmatrix} \hat{V}_{qs} \\ \hat{V}_{ds} \end{bmatrix} = W \begin{bmatrix} R_s + L_q s & 0 \\ 0 & R_s + L_d s \end{bmatrix} \begin{bmatrix} I_q \\ I_d \end{bmatrix}$$

$$= \begin{bmatrix} R_s I_q + L_q w_c (I_{q,ref} - I_q) \\ R_s I_d + L_d w_c (I_{d,ref} - I_d) \end{bmatrix}$$

which is the primary voltage equation type.

In particular, the disturbance observation part may be configured to remove the current noise using a current differentiation filtering method wherein the difference between the current command value and the actual output current may be multiplied by a cutoff frequency.

Furthermore, the current differentiation filtering method may be executed by differentiating $$\begin{bmatrix} R_s I_q + L_q w_c (I_{q,ref} - I_q) \\ R_s I_d + L_d w_c (I_{d,ref} - I_d) \end{bmatrix}$$

among the current components of the primary voltage equation of the disturbance observation part.

Additionally, a low pass filter may be connected to an output terminal of the disturbance observation part to remove a noise component.

Advantageous Effects

The present invention is able to provide the following advantageous effects by way of the above components.

First, current noise may be removed by a current differentiation using a cut-off frequency at a disturbance observation part made in the form of a reverse model with respect to a motor model, and then the disturbance may be compensated using a gain which may determine a disturbance compensation amount. Accordingly, the operation stability of a permanent magnet type synchronous motor may be obtained, and accordingly control responsibility may be obtained.

Second, when the disturbance compensation system according to the present invention is employed to a motor driven power steering (MDPS) motor control logic, a desired assistant steering force may be obtained even during a high speed steering due to the enhanced control responsibility since the operation stability of the motor has been already obtained.

Third, since a current noise component may be removed using a current differentiation filtering method, stability may become more reliable compared to a conventional disturbance observer-based back-emf compensator, and any noise influence may be reduced.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
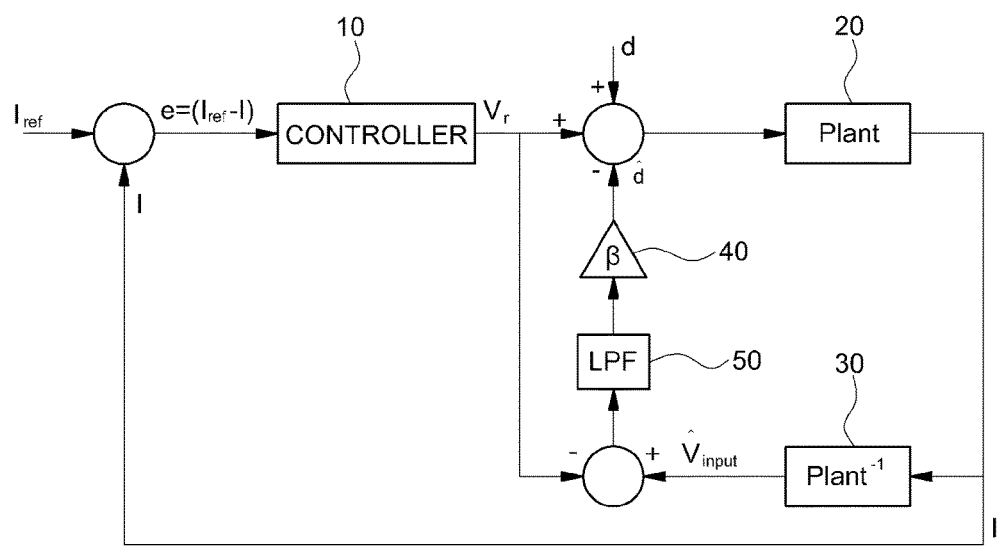
FIG. 1 is a view illustrating a concept configuration of a motor control system for compensating disturbance according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The motor control system according to the present invention may include, but is not limited to, a motor controller, a power switching module configured to switch based on an output voltage from the motor controller, and a motor driven by a switching operation of the power switching module. The motor may be configured to generate torque to drive based on a control of the motor, and since the torque is generated in proportion to the current used to control the motor, the torque may be used as an output current value for a motor current control.

In other words, when current flows in the motor, a predetermined torque may be generated, but since the torque is generated in proportion to the current, the motor torque may be expressed in the form of current, and the torque may be used as an output current value for a motor current control. The motor current control in general may be executed by a PI controller and a linear feedback control, but the control stability may be degraded due to disturbances like the back-emf, etc. Accordingly, the present invention provides a motor control system for compensating disturbance to compensate disturbances including the back-emf which may inhibit the responsibility of the motor.

Figure 2:
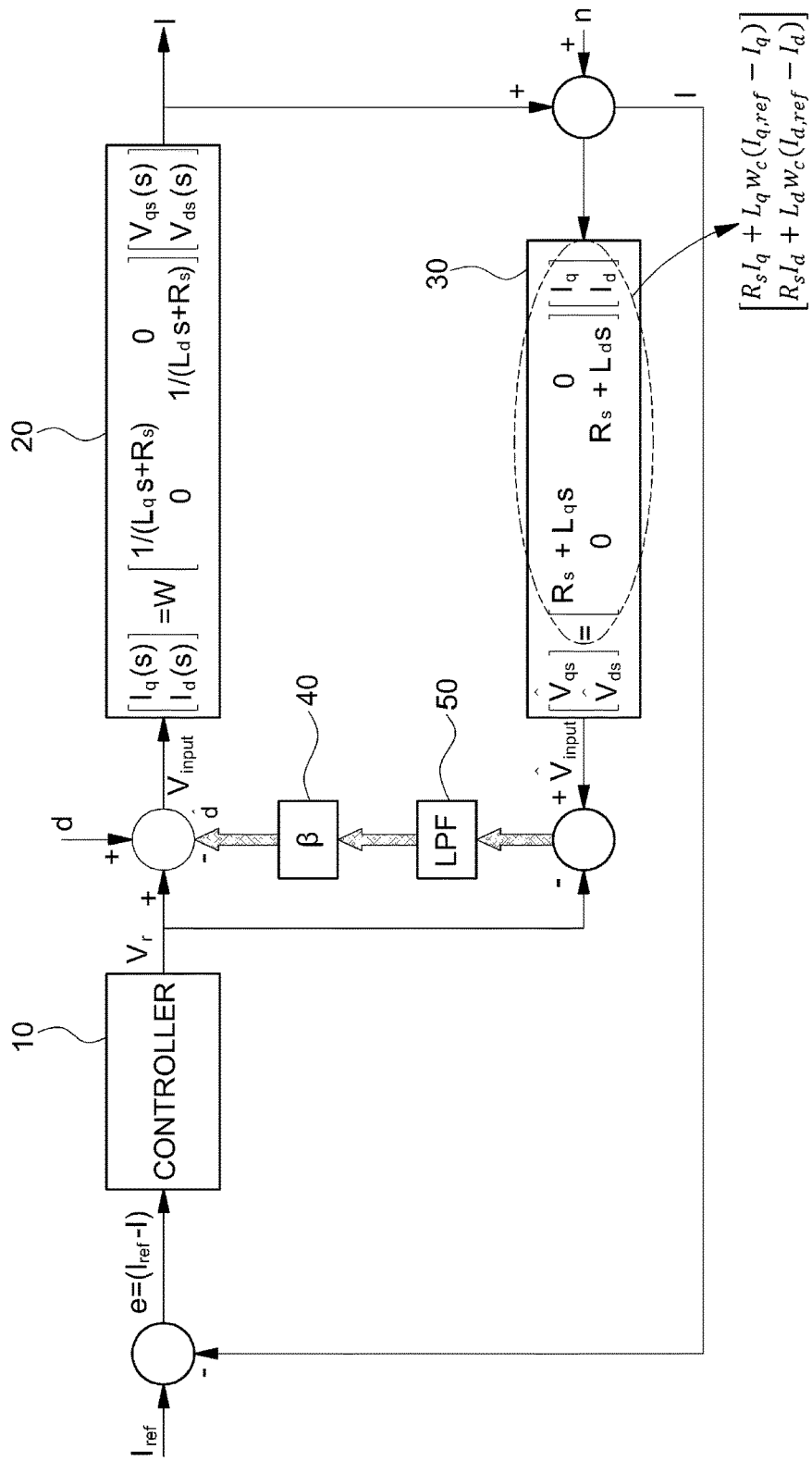
FIG. 2 is a view illustrating a control of a motor control system for compensating disturbance according to an exemplary embodiment of the present invention.

Particularly, FIG. 1 is a view illustrating a concept configuration of a motor control system for compensating disturbance according to the present invention, and FIG. 2 is a view illustrating a control of a motor control system for compensating disturbance according to the present invention. As illustrated in FIG. 1 and FIG. 2, the motor control system for compensating disturbance according to the present invention may include, but is not limited to, a controller 10 configured to supply an input voltage to the motor, a motor modeling part 20 configured to output a motor output current (a torque) in response to an input voltage from the controller 10, a disturbance observation part 30 formed in the form of a reverse model of the motor modeling part 20 and configured to remove current noise using a current differentiation filtering method, and a disturbance compensation amount determination part 40 configured to determine the disturbance compensation amount based on the disturbance estimated by the disturbance observation part. The various parts of the system may be executed by the controller 10.

The controller 10 may be a current feedback controller (e.g., a PI controller) and may be configured to apply an input voltage ($V_r$) to the motor based on the difference (e) between a current command value ($I_{ref}$) to the motor and an actual output current (I) of the motor. The motor model part 20 may be configured to output a motor torque, namely, an output current, based on an input voltage from the controller 10, and may be modeled into $$\begin{bmatrix} I_q(s) \\ I_d(s) \end{bmatrix} = W \begin{bmatrix} 1/(L_q s + R_s) & 0 \\ 0 & 1/(L_d s + R_s) \end{bmatrix} \begin{bmatrix} V_{qs}(s) \\ V_{ds}(s) \end{bmatrix}$$

which is a primary voltage equation type. Where 'W' is the multiplicative model uncertainty of the plant model. In order to simplify the logic, it can be considered that W=1.

The disturbance observation part 30 models the primary voltage equation form of the motor modeling part 20 into the form of a reverse model, which may be expressed as in the following equation 1 and which may remove the current noise using the current differentiation filtering method.

$$\begin{bmatrix} \hat{V}_{qs} \\ \hat{V}_{ds} \end{bmatrix} = W \begin{bmatrix} R_s + L_q s & 0 \\ 0 & R_s + L_d s \end{bmatrix} \begin{bmatrix} I_q \\ I_d \end{bmatrix} \quad \text{Equation 1}$$

$$= \begin{bmatrix} R_s I_q + L_q w_c (I_{q,ref} - I_q) \\ R_s I_d + L_d w_c (I_{d,ref} - I_d) \end{bmatrix}$$

$\hat{V}_{qs}$: q-axis input voltage estimate
$\hat{V}_{ds}$: d-axis input voltage estimate
Rs: Stator's resistance
Lq: q-axis inductance
Ld: d-axis inductance
s: Laplace domain (frequency domain)
Rs I→Rs Iq
Rs I→Rs Id More specifically, the disturbance observation part 30 may be configured to remove the current noise using the current differentiation filtering method wherein the value of [$W_c(I_{ref}-I)$] obtained by multiplying the difference (e) between the current command value ($I_{ref}$) and the actual output current (I) of the motor by the cutoff frequency (Wc, cutoff frequency) is differentiated.

The cutoff frequency may be a cutoff frequency of the controller 10 (example, PI controller) and represents a limit frequency to pass only the desired frequency band.

The current differentiation filtering method may be executed by differentiating $$\begin{bmatrix} R_s I_q + L_q w_c (I_{q,ref} - I_q) \\ R_s I_d + L_d w_c (I_{d,ref} - I_d) \end{bmatrix}$$

among the current components of the primary voltage equation of the disturbance observation part 30.

In other words, according to the current differentiation filtering method, $$\begin{bmatrix} R_s I_q + L_q w_c (I_{q,ref} - I_q) \\ R_s I_d + L_d w_c (I_{d,ref} - I_d) \end{bmatrix}$$

among the current components of the primary voltage equation of the disturbance observation part 30 is differentiated, and the differentiation may be executed by the equation 2 below.

$$\frac{dI}{dt} = \omega_c (I_{ref} - I) \quad \text{Equation 2}$$

I→Iq and Id (Two independent measurements)

The disturbance compensation amount determination part 40 is a constant gain (β) that determines the disturbance compensation amount. The disturbance compensation amount may be determined based on the disturbance estimated by the disturbance observation part 30, namely, based on the compensation input voltage input $\hat{V}_{input}$ estimated by the disturbance observation part 30 after the current noise is removed by the current differentiation filtering method.

Meanwhile, to remove any noise components, a low pass filter 50 (LPF, Low Pass Filter) may be further connected to the output terminal of the disturbance observation part 30 since the constant gain of the disturbance compensation amount determination part 40 may amplify the noise. The disturbance control procedure of the disturbance compensation system according to the present invention will be described with reference to FIG. 2.

First, when the difference (e=$I_{ref}$−I) between the current command value ($I_{ref}$) to the motor and the actual output current (I) output via the motor modeling part 20 is input to the controller 10, the controller 10 may be configured to apply an input voltage ($V_r$) to compensate the above difference (e=$I_{ref}$−I). Particularly, the input voltage ($V_r$) and the final input voltage ($V_{input}$) including various disturbances (d), for example, the back-emf, may be input to the motor modeling part 20.

The motor modeling part 20 may be configured to output the motor torque, namely, the actual output current (I), based on the final input voltage ($V_{input}$) based on the primary voltage equation $$\begin{bmatrix} I_q(s) \\ I_d(s) \end{bmatrix} = W \begin{bmatrix} 1/(L_q s + R_s) & 0 \\ 0 & 1/(L_d s + R_s) \end{bmatrix} \begin{bmatrix} V_{qs}(s) \\ V_{ds}(s) \end{bmatrix}.$$

Further, the disturbance observation part 30 may be configured to execute a current differentiation filtering control to differentiate the value $W_c(I_{ref}-I)$ obtained by multiplying the difference (e) between the current command value ($I_{ref}$) and the actual output current (I) of the motor by the cutoff frequency ($W_c$, cutoff frequency). When differentiating $$\begin{bmatrix} R_s I_q + L_q w_c (I_{q,ref} - I_q) \\ R_s I_d + L_d w_c (I_{d,ref} - I_d) \end{bmatrix}$$

among the current components of the primary voltage equation of the disturbance observation part 30, the current differentiation may be executed by the method as in the equation 2.

Figure 3:
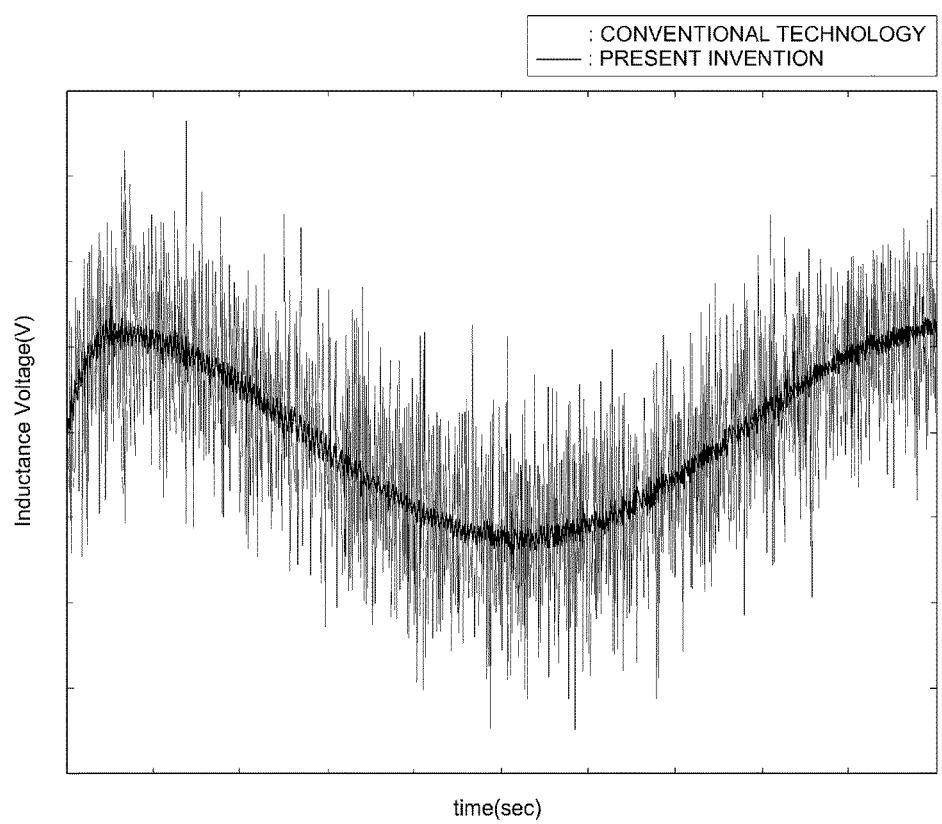
FIG. 3 is a graph showing a state where a current noise component has been removed using a current differentiation filtering method of a motor control system for compensating disturbance according to an exemplary embodiment of the present invention.

As a result of the current differentiation filtering control, as illustrated in FIG. 3, when only the current signal was differentiated, a substantial current noise occurred, and as a result of the differentiation executed together with the cutoff frequency, it was possible to confirm that the effect of the current noise was reduced by about 50 times. Accordingly, since instability which may occur due to the differentiation may be removed, it may be theoretically possible to unlimitedly increase the gain which may determine the disturbance compensation amount.

Additionally, the disturbance compensation amount determination part 40 may be configured to determine the disturbance compensation amount ($\hat{d}$) based on the disturbance estimated by the disturbance observation part 30, namely, the compensation input voltage ($\hat{V}_{input}$) estimated by the disturbance observation part 30 after the current noise is removed by the current differentiation filtering method.

The gain (β) which may determine the disturbance compensation amount may be set as a constant value, but since β may be expressed in the form of β(s) which indicates the frequency function, the following equation 3 may be obtained.

$$\hat{d} = \frac{\beta(s)}{1+\beta(s)} d \qquad \text{Equation 3}$$

In the above equation 3, H(s) may become a direct transfer function between the disturbance and the disturbance compensation when $$\frac{\beta(s)}{1+\beta(s)}$$

is set as H(s).

When H(s) is a constant of 0.9, it may indicate that 90% of the disturbance may be compensated in all the frequency regions, and β=9. When H(s) is set in the form of the low frequency filter such as $$H(s) = 0.9 \frac{2\pi f_\beta}{s + 2\pi f_\beta},$$

since it may be possible to compensate 90% of the disturbance in the low frequency region, the same performance as the conventional disturbance observer may be obtained.

Consequently, the conventional disturbance observer uses a low frequency filter, and the present invention is able to provide an improved operation stability of the permanent magnet type synchronous motor and may enhance a control responsibility by compensating the exterior without using the low frequency filter.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A motor control system for compensating disturbance, comprising:
   a controller configured to supply an input voltage to a motor based on the difference between a current command value to a motor and an actual output current of the motor;
   a motor modeling part configured to output a motor output current based on an input voltage from the controller;
   a disturbance observation part formed as a reverse model of the motor modeling part and configured to remove current noise using a current differentiation filtering method; and
   a disturbance compensation amount determination part configured to determine a disturbance compensation amount based on the disturbance estimated by the disturbance observation part,
   wherein the disturbance observation part removes the current noise using a current differentiation filtering method wherein the difference between the current command value and the actual output current is multiplied by a cutoff frequency,
   wherein the current differentiation filtering method is executed to differentiate $$\begin{bmatrix} R_s I_q + L_q w_c (I_{q,ref} - I_q) \\ R_s I_d + L_d w_c (I_{d,ref} - I_d) \end{bmatrix}$$

among the current components of the primary voltage equation of the disturbance observation part, wherein the value obtained by multiplying the difference between the current command value and the actual output current like $$\frac{dI}{dt} = \omega_c (I_{ref} - I)$$

by the cutoff frequency is differentiated, and
   wherein I is output current, L is inductance, Rs is stator resistance, s is frequency domain, V is input voltage, and $w_c$ is cutoff frequency.

2. The system of claim 1, wherein the motor modeling part is modeled into $$\begin{bmatrix} I_q(s) \\ I_d(s) \end{bmatrix} = W \begin{bmatrix} 1/(L_q s + R_s) & 0 \\ 0 & 1/(L_d s + R_s) \end{bmatrix} \begin{bmatrix} V_{qs}(s) \\ V_{ds}(s) \end{bmatrix}$$

which is a primary voltage equation type,
   wherein I is output current, L is inductance, Rs is stator resistance, s is frequency domain, and V is input voltage.

3. The system of claim 1, wherein the disturbance observation part is formed by reversely modeling the motor modeling part into $$\begin{bmatrix} \hat{V}_{qs} \\ \hat{V}_{ds} \end{bmatrix} = \begin{bmatrix} R_s + L_q s & 0 \\ 0 & R_s + L_d s \end{bmatrix} \begin{bmatrix} I_q \\ I_d \end{bmatrix} = \begin{bmatrix} R_s I_q + L_q w_c (I_{q,ref} - I_q) \\ R_s I_d + L_d w_c (I_{d,ref} - I_d) \end{bmatrix}$$

which is the primary voltage equation type, wherein I is output current, L is inductance, Rs is stator resistance, s is frequency domain, V is input voltage, and $w_c$ is cutoff frequency.

4. The system of claim 1, wherein a low pass filter is connected to an output terminal of the disturbance observation part to remove a noise component.

5. A motor control method for compensating disturbance, comprising:
supplying, by a controller, an input voltage to a motor based on the difference between a current command value to a motor and an actual output current of the motor;
outputting, by a motor modeling part, a motor output current based on an input voltage from the controller;
removing, by a disturbance observation part formed as a reverse model of the motor modeling part, current noise using a current differentiation filtering method; and
determining, by a disturbance compensation amount determination part, a disturbance compensation amount based on the disturbance estimated by the disturbance observation part,
wherein the disturbance observation part removes the current noise using a current differentiation filtering method wherein the difference between the current command value and the actual output current is multiplied by a cutoff frequency,
wherein the current differentiation filtering method is executed to differentiate $$\begin{bmatrix} R_s I_q + L_q w_c (I_{q,ref} - I_q) \\ R_s I_d + L_d w_c (I_{d,ref} - I_d) \end{bmatrix}$$

among the current components of the primary voltage equation of the disturbance observation part, wherein the value obtained by multiplying the difference between the current command value and the actual output current like $$\frac{dI}{dt} = \omega_c (I_{ref} - I)$$

by the cutoff frequency is differentiated, and
wherein I is output current, L is inductance, Rs is stator resistance, s is frequency domain, V is input voltage, and $w_c$ is cutoff frequency.

6. The method of claim 5, wherein the motor modeling part is modeled into $$\begin{bmatrix} I_q(s) \\ I_d(s) \end{bmatrix} = W \begin{bmatrix} 1/(L_q s + R_s) & 0 \\ 0 & 1/(L_d s + R_s) \end{bmatrix} \begin{bmatrix} V_{qs}(s) \\ V_{ds}(s) \end{bmatrix}$$

which is a primary voltage equation type,
wherein I is output current, L is inductance, Rs is stator resistance, s is frequency domain, and V is input voltage.

7. The method of claim 5, wherein the disturbance observation part is formed by reversely modeling the motor modeling part into $$\begin{bmatrix} \hat{V}_{qs} \\ \hat{V}_{ds} \end{bmatrix} = \begin{bmatrix} R_s + L_q s & 0 \\ 0 & R_s + L_d s \end{bmatrix} \begin{bmatrix} I_q \\ I_d \end{bmatrix} = \begin{bmatrix} R_s I_q + L_q w_c (I_{q,ref} - I_q) \\ R_s I_d + L_d w_c (I_{d,ref} - I_d) \end{bmatrix}$$

which is the primary voltage equation type,
wherein I is output current, L is inductance, Rs is stator resistance, s is frequency domain, V is input voltage, and $w_c$ is cutoff frequency.

8. The method of claim 5, wherein a low pass filter is connected to an output terminal of the disturbance observation part to remove a noise component.

* * * * *